W. D. KEMP.
EDUCATIONAL GAME BOARD.
APPLICATION FILED AUG. 4, 1919.
1,339,399.
Patented May 11, 1920.
Fig. 1.
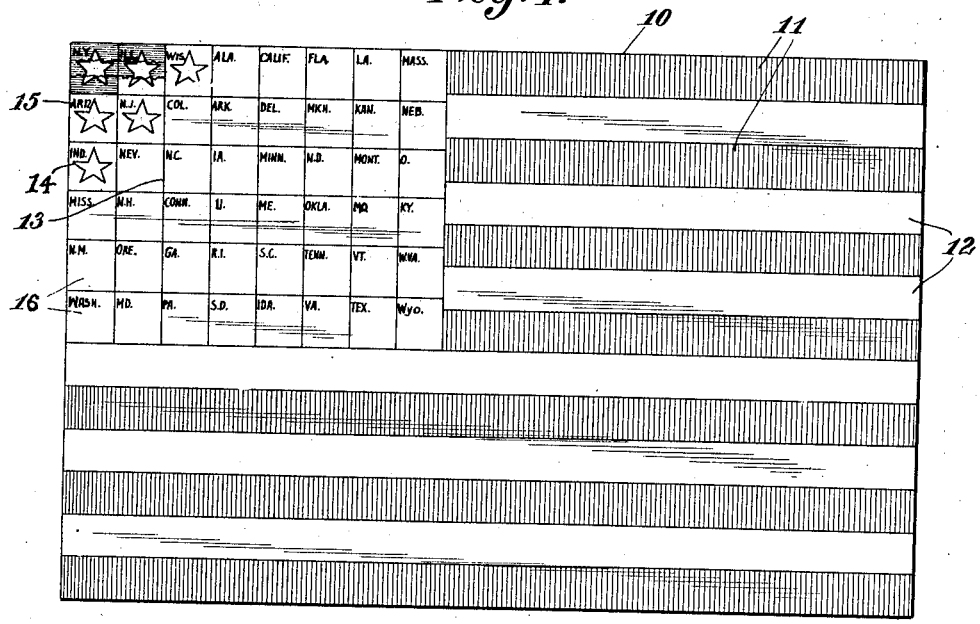
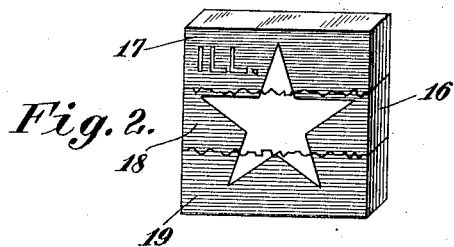
Fig. 2.
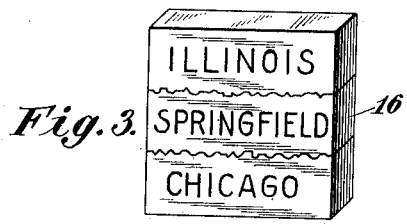
Fig. 3.
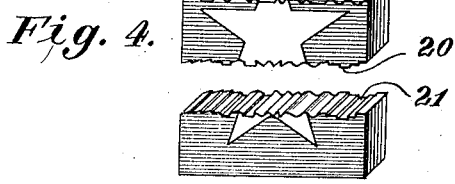
Fig. 4.
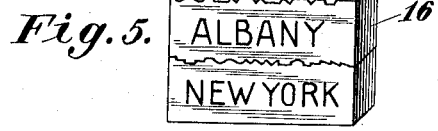
Fig. 5.
Inventor
Walter Dewitt Kemp.

UNITED STATES PATENT OFFICE.

WALTER DEWITT KEMP, OF NEW YORK, N. Y.

EDUCATIONAL GAME-BOARD.

1,339,399.   Specification of Letters Patent.   Patented May 11, 1920.

Application filed August 4, 1919. Serial No. 315,289.

*To all whom it may concern:*

Be it known that I, WALTER DEWITT KEMP, a citizen of the United States, residing at New York city, in the county of New York and State of New York, have invented new and useful Improvements in Educational Game-Boards, of which the following is a specification.

This invention relates to game boards, and more particularly to an educational toy or game by means of which a person or persons may become familiarized with the names of the States of the Union and certain facts relating to each individual State.

The principal object of the invention is to provide a game which, while being entertaining, also includes the instructive feature of familiarizing the players with the names of the various States and information regarding them, such as their capitals, chief industrial centers, largest cities, principal rivers, highest mountain ranges, chief industries, geographical characteristics, historical features, and the like.

As another object, the invention contemplates the provision of a game board consisting of a flat surface provided with alternate red and white stripes arranged to suggest the stripes of the national emblem, in the upper left hand corner of which is a space into which the playing pieces are adapted to be fitted to form a blue field studded with white stars representing the various States. It will thus be seen that when all the playing pieces are properly assembled in the space for receiving the same (which can only be done if the correct sections of their respective States are played, as will hereinafter appear), the whole will present a suggestion of the national emblem, producing at the same time a novel and lasting impression on the minds of children or others using the device, regarding educational facts represented by the assembled sections.

A further object of the invention is to provide a plurality of playing pieces, each of which consists of one or more sections or elements which, when assembled, form a complete playing piece carrying on its obverse side a white star surrounded by a blue field. In order to familiarize the player with the details concerning the various States, one section of each playing piece is provided on its reverse side with the name of the State represented by the section, while the mating sections carry on their reverse sides such information as the name of the largest city, the capital of the State, and the like, it being understood that this information may be varied (as the players learn), to include other facts, such as the largest river, the highest mountain range, etc.

With the above and other objects in view, the invention comprises such novel construction, combination and arrangement of parts as will appear by a perusal of the specification and claims, and by reference to the accompanying drawing which forms a part of this application, which is to be considered as merely illustrative and not as restrictive or limitative, and in which:

Figure 1 is a plan view of a game board constructed in accordance with the invention, showing certain of the game pieces in place thereon;

Fig. 2 is a perspective view of one of the game pieces assembled;

Fig. 3 is a perspective view of the reverse side of Fig. 2;

Fig. 4 is a view similar to Fig. 2, illustrating one of the sections partly removed to show the serrated mating edges; and, Fig. 5 is a view similar to Fig. 3, illustrating the manner in which the information concerning the various States is conveyed.

Similar numerals of reference indicate corresponding parts in the several views.

Referring to the drawings in detail, the numeral 10 will be seen to designate a game board provided with a plurality of alternate red and white stripes 11 and 12, respectively. As shown in the drawing, the board is provided at its upper left hand corner with a space or cut-out 13. This cut-out, however, does not extend clear through the thickness of the board, but leaves the bottom part of the board at the place of said cut-out as a thin, rigid base on which the sections may be placed, as will hereinafter appear. The material from the cut-out is cut or divided into a plurality of sections 16, preferably substantially square. On the top side of each section and preferably in one corner, appears the initials of a State 15; and a white star 14 in its surrounding blue field also appears on the top side of each section. The sections, in the adaptation illustrated, are 48 in number. The game, as illustrated, contemplates the knowing or learning of two facts in regard to each State, viz: its capital and its largest city. Each section 16 is sub-divided into three approximately equal smaller sections 17, 18 and 19, therefore. These sections are best illustrated in Figs. 2 to 5 inclusive and are designated in their entireties by the numeral 16. The central section 18 is formed along its longer edges with a plurality of serrations 20 which are designed to mate with the serrations 21 of the end sections 17 and 19. On the reverse side of each small section 17 appears the name of a State, while on the reverse side of each small section 18 and 19 appears the name of the capital and of the largest city, respectively, of that State. The serrations of the various sections are so arranged and varied as to prevent the wrong assembling of the pieces. Thus it will be seen that the section "Springfield", for instance, does not fit into the section "New York" or into any section except "Illinois" of which State it is the capital. Similarly, the section "Chicago" does not fit into any section except "Springfield" the capital of the State of which Chicago is the largest city. The same applies to all the sections. When the three sections are properly assembled, the game piece will present on its obverse side a white star surrounded by a blue field. It will thus be seen that it is possible to form a star from each State if the three sections fit, and that they will fit only if the right sections are played.

In the operation of the invention, the game is to see which player can form the largest number of stars. The game may be played as follows: The 144 sections are placed on the board, reverse side up, and not in their proper relation to each other, but mixed or scattered. The player who opens the game selects a section which has on it the name of a State, any State which he believes he knows the capital and the largest city of. This section he places, right side up, in the large cut-out 13 in the corner of the board. He may place it any place in the cut-out, as this is immaterial, but it is preferably placed in one of the upper corners, so as to permit of the stars being built up solidly against each other. The other player or players now play similarly, selecting a section which bears the name of a State they believe they know the capital and the largest city of, and placing the section in the cut-out, preferably in the State section space contiguous to the first State section. The first player, after awaiting his turn, now selects from among the intermediate sections, which are the State capital sections, the section which bears the name of the city which he thinks is the capital of the State the section of which he has already played, and places this State capital section, right side up, against his State section, in the cut-out. If the section played is the capital of that State, the serrations match, and the sections fit together. The other players play similarly, each in his turn. The first player, when his turn again arrives, selects the section which he thinks is the largest city of his State, and plays it, right side up, against the capital section, in the cut-out. If correct, these sections also fit, and a perfect star will be formed, such as is shown in Fig. 2. If, however, a wrong city is played either time, the serrations do not mate and the sections do not fit; hence the formation of a star is impossible, and the player has lost his chance of making a star for that particular State because his knowledge concerning its capital and largest city was not perfect. This process is repeated until all the sections are used, at which time the space 13 is covered. The person having formed the largest number of stars wins the game.

The rules for playing may be varied, as well as the information on the playing pieces, and the various sections completing a whole may be of any selective number, the above being in the nature of a general outline of procedure to which it is not desired to limit myself.

From the foregoing, it will be seen that a simple, and yet a novel, amusing and educational game has been disclosed, capable of long and continuous service, which is well adapted to provide entertainment and instruction for children, and which may be played by one, a few, or a large number of players.

The several elements of the combination may be constructed in any suitable size, shape or form, and they may be made of any selective kind of material, so long as the various members of the combination co-act and coöperate to perform the functions and produce the results contemplated, without departing from the spirit of the invention.

What I claim is:

1. A game apparatus including a game board, a plurality of grouped series of game pieces adapted for coöperation with the game board, each game piece comprising elongated rectangular sections, and serrations preventing the association of unrelated sections.

2. A game apparatus including a board, a plurality of sectional game pieces, one section of each of which carries the name of an article and the other sections of said game piece carrying information relative to said article, means indicative of the article carried on the reverse of one or more of said sections, and means to prevent the association of unrelated sections.

3. A game apparatus including a game board striped to simulate the national flag, said striped surface having a space in the upper left hand corner, a pluralty of sectional game pieces adapted to be fitted over the space on the board, said game pieces having white stars on blue fields on their obverse side, certain sections of said game pieces bearing the names of the various States and certain other sections of said pieces bearing information relative to its respective State.

4. A game apparatus including a game board striped to simulate the national flag, said striped surface having a space in the upper left hand corner, a plurality of sectional game pieces adapted to be fitted over the space on the board, said game pieces having white stars on blue fields on their obverse side, certain sections of said game pieces bearing the names of the various States and certain other sections of said pieces bearing information relative to its respective State, and means preventing the association of unrelated sections.

In testimony whereof I have signed my name to this specification.

WALTER DEWITT KEMP.